UNITED STATES PATENT OFFICE.

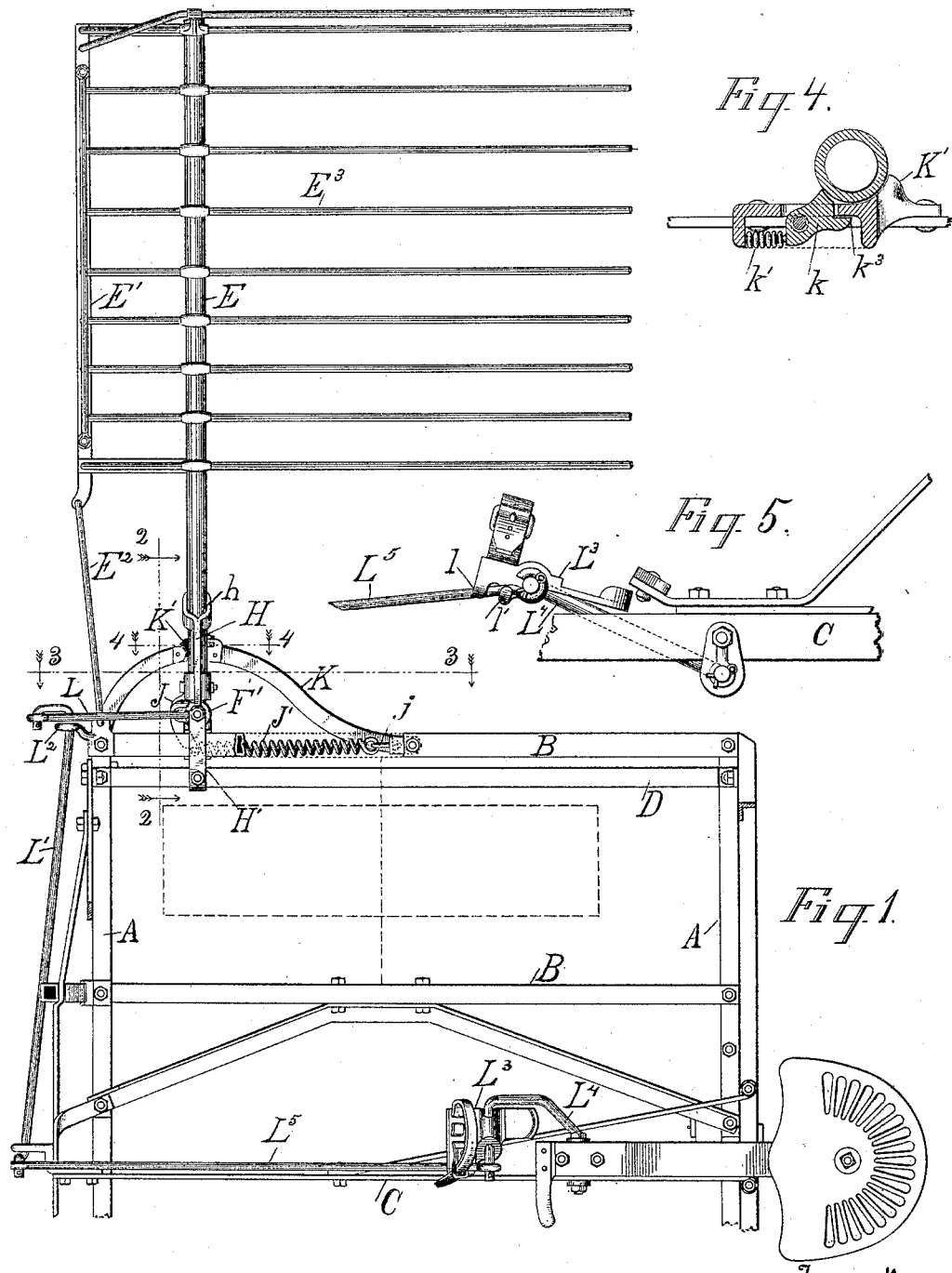

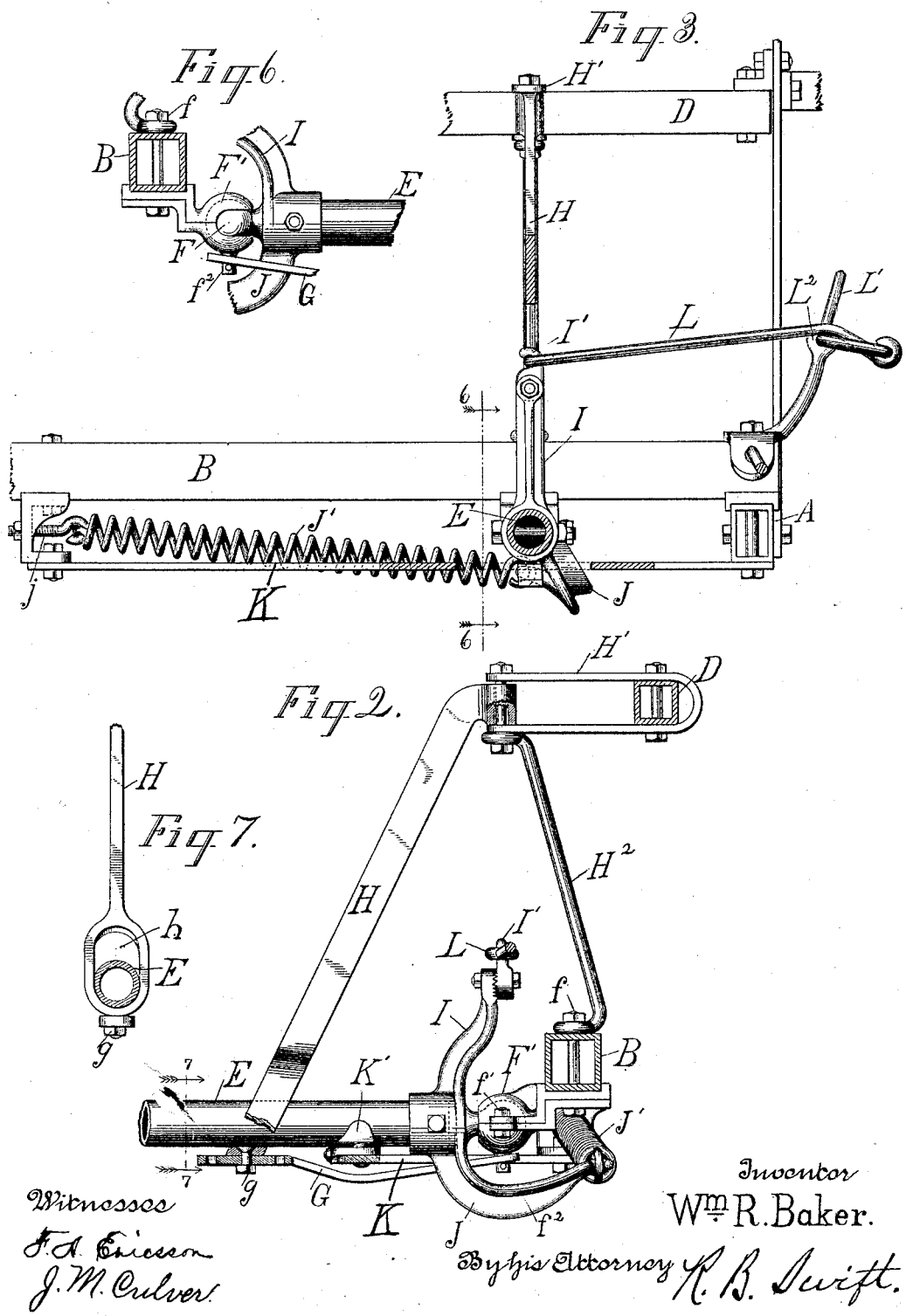

WILLIAM R. BAKER, OF CHICAGO, ILLINOIS, ASSIGNOR TO THE McCORMICK HARVESTING MACHINE COMPANY, OF SAME PLACE.

BUNDLE-CARRIER.

SPECIFICATION forming part of Letters Patent No. 440,687, dated November 18, 1890.

Application filed May 31, 1890. Serial No. 353,831. (No model.)

*To all whom it may concern:*

Be it known that I, WILLIAM R. BAKER, a citizen of the United States, residing at Chicago, in the county of Cook and State of Illinois, have invented certain new and useful Improvements in Bundle-Carriers, of which the following is a specification.

On January 28, 1890, Edwin M. Kellogg obtained Letters Patent No. 420,274 for a slatted bundle-carrier that discharged its load by tilting upon a rocking supporting-bar, and to pass obstructions that were in its path could be swung to the rearward toward and beneath the deck of the machine, while it was arranged to be brought back into receiving position by a spring.

The object of my invention is to improve the method of attachment to the self-binding harvester of carriers constructed similar to the Kellogg device, so that the rear end of the carrier-platform shall freely drop by the rocking of the supporting-bar, that it shall, should an obstruction be encountered, swing back and to the side of the machine, and, further, should the main wheel of the machine drop into a hole and the outer end of the carrier strike the ground that it be not torn from the machine, but have freedom of movement upwardly and rearwardly as the machine advances, and that the spring be so attached as to better exert its force in bringing the carrier back to receiving position. I have also improved the foot-controlling treadle and have added a spring-pawl, all of which will be hereinafter fully set forth in the description.

In the drawings, Figure 1 is a top plan view of a bundle-carrier of the Kellogg type attached to the frame-work of a harvester in accordance with my invention. The seat of the harvester and the controlling mechanisms therefrom are also shown. Fig. 2 is a front view on the line 2 2 of Fig. 1, with the bottom part of the stirrup broken away to show the manner of adjustment of the outer end of the carrier. Fig. 3 is a side view of the attaching and controlling devices on the line 3 3 of Fig. 1. Fig. 4 is a part sectional view of the spring-held pawl and stop on the line 4 4 of Fig. 1. Fig. 5 is a side view of the foot-plate and treadle. Fig. 6 is a rear view showing the ball-and-socket connection of the end of the controlling bar upon the frame on the line 6 6 of Fig. 3. Fig. 7 is a side view on the line 7 7 of Fig. 2.

In the drawings, A A are the sills of the harvester-frame; B, the cross-girts thereof; C, the cross-girt of the elevators, commonly called the "seat-plank;" and D is a cross-girt between the sides of the elevator on the stubble side of the frame-work of the harvester.

In the Kellog type of carrier, which I have used in the embodiment of my invention, E is the supporting rocking bar, E' is the controlling bar connected to the frame-work of the machine by the rod $E^2$, and individually pivoted to both the controlling bar and the rocking bar are receiving-fingers $E^3$, and upon the inner end of the supporting rocking bar E, integral therewith or rigidly attached thereto, as shown, is a ball F, (seen most clearly in Fig. 6,) which has a bearing in the socket F', which is bolted to the cross-girt B of the harvester-frame. The socket F' is made in two parts, held together by the main bolt $f$, that passes through the sill B, and by the small bolt $f'$ in forwardly-projecting ears from both halves of the socket. Both halves of the socket F' are cut away, so that the neck of the ball F will have free passage when the rocking bar E is swung through its movement from a position at right angles to the path of the machine to one parallel therewith, or nearly so. From the center of the ball portion of the lower half of the socket is a downwardly-extending pivot $f^2$, upon which is mounted the spreading-bar G and held thereon by a cotter. The outer extremity of the bar G is bolted to the stirrup-link H, that is attached to any fixed part of the harvester-frame above the ball-and-socket joint F F'. In the construction which I have shown a clevis H' extends from the cross-girt D of the harvester, and the upper end of stirrup-link H is pivoted therein. When it is desired to raise or lower the outer end of the supporting rocking bar E, the bolt $g$ is moved into the different holes in the bar G, as is shown in the broken-away portion in Fig. 2. To support and strengthen the staple H', a brace-rod $H^2$ is extended from its extremity to the frame of the harvester. The lower extremity of the stirrup-link H is formed with an elongated slot $h$ therein, (see Fig. 7,) through which the supporting rocking bar E passes, and upon the bottom of which it rests. The slot is elongated, so that should the outer end of the bar strike the ground it can freely rise in the slot without harming the attachment.

The parts so far described are solely for the support of the carrier. The controlling parts to keep the carrier in receiving position to dump it after it has been loaded, to limit its movement forward, and to bring it back into position after passing an obstruction I will now describe.

Extending upward from the inner end of the controlling rocking bar E is an arm I, that is connected by suitable link-and-crank mechanisms with a bell-crank at the seat convenient for the operation of the driver.

In the embodiment which I have shown of the invention the upwardly-extending arm I is fitted with a hook-extension I'. Both the arm I and the extension I' are fitted with serrations to prevent slipping when bolted in any position. By means of the extension I' the supporting rocking bar E can be varied in its rocking movement.

Extending downward, somewhat forward, inward, rearward, and fitted with a hook-extension, is an arm J. The shape of this arm, as described, is not essential in its function; but in experimenting it has been found to give the best results when formed as described.

Hooked over the arm J is a rearwardly-extending spring J', that is attached to a fixed part of the machine. It is drawn to a proper degree of tightness by the small screw-bolt $j$. Not only does this spring serve to return the carrier to position after it has been thrown to the rearward in passing an obstruction, but when the carrier has been rocked to dump its load, which action stretches the spring, it serves to help return the carrier to its receiving position.

To furnish a stop for the carrier in its forward movement, I attach a curved brace-arm K to the sills of the harvester and extend it outwardly beneath the rocking supporting-bar E, upon which at the proper position, so that the bar E shall be at right angles to the path of the machine, I fasten a stop K'. At the rear of this stop and pivoted in it is a spring-pressed pawl $k$, (shown in Fig. 4,) with a short reach in front, over which the controlling-bar must be pushed when it strikes an obstruction, and a longer reach behind, over which the supporting-bar E more easily passes when it is being returned to position. The spring $k'$, acting upon the heel of the pawl $k$, allows the pawl to be pressed beneath the surface of the stop K', while an extended portion $k^3$ of the pawl $k$ prevents too great a movement upward. As the harvesting and binding machine passes over rough ground in the field, the carrier is frequently jolted, and while the force of the spring would tend always to hold it forward in receiving position against the stop K', yet the seat formed by the pawl $k$ and stop K' will hold it more steadily.

The carrier is prevented from dropping downward at the rear by the connecting-link L, which is hooked over the upwardly-extending arm I' at one end and at the other is joined to the lower cranked portion of the long bell-crank L'. The rod L is bent downward as it passes over the long bell-crank L', so that its pivotal connection to L' is below the pivot $L^2$ of the long bell-crank L', and thus forms a lock. Should the carrier strike an obstruction at this time and be swung to the rear, the position of the arm I would not be changed, and when the carrier was returned to place by the force of the spring J' it would still be in receiving position for bundles. The weight of the load usually falls upon the platform somewhat to the rear of the supporting rocking bar E, and when the operator, with his foot strapped upon the foot-plate $L^3$, which is mounted upon one arm of the double crank $L^4$, lifts the plate toward himself, the plate being connected to the other crank-arm of the long bell-crank L' by the rod $L^5$, the lock is released, and the carrier drops from its own weight and the weight of the load. If for any reason the larger part of the weight of the load should be ahead of the supporting-bar E, the controlling mechanisms would allow the driver, his foot being strapped to the foot-plate, to force the rear of the carrier downward, and thus deposit the load.

To maintain the foot-plate $L^3$ at all times in a position for the driver's foot to naturally rest upon it, I attach it to the rod $L^5$ by two outwardly-extending arms $l$ and $l'$, the top one $l$ extending downward and hooking over the rod $L^5$ and the lower one $l'$ extending upward and hooking over the rod $L^5$. As the foot-plate is carried through the arc of its movement, it is always in the best position for the operator.

It will be understood that the construction of the parts described may be somewhat varied in detail, and I do not therefore intend to limit myself to the precise arrangement described herein and shown in the drawings; but What I do claim is—

1. In combination with a self-binding harvester, a tilting folding bundle-carrier attached thereto, and a link pivoted to the frame of the harvester at its upper end, its lower supporting the carrier and held in position by a spreader-bar extending from the link to the machine, substantially as and for the purpose specified.

2. The combination, to form the supporting device for the outer end of a bundle-carrier that tilts to discharge its load and folds to the side of the harvester to pass obstructions, of the stirrup-link attached at its upper end to the frame of the machine above the carrier, the supporting-bar of the carrier passing through an elongated slot in its lower end and held in position by a spreader-bar pivoted at its inner end to the machine, substantially as and for the purpose specified.

3. In a bundle-carrier for self-binding harvesters, the combination of the supporting-bar pivoted to the frame of the harvester, a stirrup-link pivoted to the harvester-frame above the joint of the supporting-bar, a spreader-bar attached to the link at its outer end and pivoted to the machine at its inner end below the joint of the supporting-bar, an upright arm from the supporting-bar, and link-and-lever connections to the seat, substantially as and for the purpose specified.

4. In a bundle-carrier for self-binding harvesters, the combination of the supporting-bar extending outward from the path of the machine and attached thereto so that it can rock and swing to the rear, an upright arm therefrom, connection therewith by which the carrier is operated, a downwardly inwardly-extending arm from the supporting-bar, and a spring attached thereto and to the frame, substantially as and for the purpose specified.

5. In a bundle-carrier that swings to the rear and folds to the side of the machine to pass obstructions, a stop attached to a fixed part of the machine to limit the forward movement of the carrier, and a locking-pawl to hold the carrier in receiving position against the stop, and over which the carrier is carried when folded to the side of the machine, substantially as and for the purpose specified.

6. In a bundle-carrier for self-binding harvesters, in combination with a rolling supporting-bar, a downwardly inwardly-extending arm therefrom, and a spring connecting said arm with the harvester-frame, substantially as and for the purpose specified.

7. In a bundle-carrier for self-binding harvesters, a double crank pivoted by one arm to the harvester-frame, and a foot-plate mounted on the other arm, which is connected by link-and-lever connections with the carrier, the foot-plate fitted with hooked arms which encircle the connecting-link, substantially as and for the purpose described.

8. In combination with a self-binding harvester to form a bundle-carrier, a supporting-bar E, pivoted with a ball-and-socket joint to the harvester-frame, a controlling-bar E', attached to the harvester-frame, a series of fingers $E^3$, individually pivoted to both controlling and supporting bars, a link H, brace G, arms I and J, spring J', stop K', and link-and-lever connections from the arm I with the driver's seat, all arranged and operated substantially as shown and described.

9. In combination with a folding tilting bundle-carrier attached to the harvester by a universal joint, a link pivoted at its upper end to the frame of the harvester, its lower end extending outwardly and freely supporting the carrier.

10. In combination with a self-binding harvester, a bundle-carrier attached thereto, and a link pivoted to the frame of the harvester at its upper end, its lower supporting the carrier and held in position by a spreader-bar, with means whereby the link can be adjusted at different points on the spreader-bar to raise and lower the outer end of the carrier.

WILLIAM R. BAKER.

Witnesses:
GEO. WATERMAN,
JOHN V. A. HASBROOK.